United States Patent
Cordova

(10) Patent No.: US 7,162,538 B1
(45) Date of Patent: Jan. 9, 2007

(54) PEER TO PEER SOFTWARE DISTRIBUTION SYSTEM

(75) Inventor: Rois O. Cordova, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 549 days.

(21) Appl. No.: 09/678,549

(22) Filed: Oct. 4, 2000

(51) Int. Cl.
*G06F 15/16* (2006.01)
*G06F 9/44* (2006.01)
*G06F 9/445* (2006.01)

(52) U.S. Cl. ............... 709/238; 709/245; 717/172; 717/177

(58) Field of Classification Search ............... 709/200, 709/221–223, 206, 207, 201, 238, 245; 717/178, 717/170, 177, 168, 174, 172; 713/100; 707/10
See application file for complete search history.

(56) References Cited

U.S. PATENT DOCUMENTS

| | | | | |
|---|---|---|---|---|
| 5,079,767 | A * | 1/1992 | Perlman | 370/408 |
| 5,355,371 | A * | 10/1994 | Auerbach et al. | 370/255 |
| 5,421,009 | A * | 5/1995 | Platt | 709/221 |
| 5,488,723 | A * | 1/1996 | Baradel et al. | 719/315 |
| 5,706,431 | A | 1/1998 | Otto | |
| 5,812,793 | A * | 9/1998 | Shakib et al. | 709/201 |
| 5,845,090 | A | 12/1998 | Collins, III et al. | |
| 5,850,396 | A * | 12/1998 | Gilbert | 370/390 |
| 6,018,747 | A * | 1/2000 | Burns et al. | 707/203 |
| 6,052,721 | A * | 4/2000 | Shepherd et al. | 709/221 |
| 6,137,796 | A * | 10/2000 | Derango et al. | 370/389 |
| 6,144,992 | A * | 11/2000 | Turpin et al. | 709/208 |
| 6,182,117 | B1 * | 1/2001 | Christie et al. | 709/205 |
| 6,192,396 | B1 * | 2/2001 | Kohler | 709/206 |
| 6,256,668 | B1 * | 7/2001 | Slivka et al. | 709/220 |
| 6,256,672 | B1 * | 7/2001 | Redpath | 709/232 |
| 6,289,511 | B1 * | 9/2001 | Hubinette | 717/173 |
| 6,360,221 | B1 * | 3/2002 | Gough et al. | 707/10 |
| 6,560,643 | B1 * | 5/2003 | Shepherd et al. | 709/220 |
| 6,633,570 | B1 * | 10/2003 | Lovell et al. | 370/400 |
| 6,742,015 | B1 * | 5/2004 | Bowman-Amuah | 718/101 |

FOREIGN PATENT DOCUMENTS

| | | | |
|---|---|---|---|
| EP | 0 726 663 | | 8/1996 |
| EP | 726663 A2 | * | 8/1996 |
| EP | 0 811 942 | | 12/1997 |
| EP | 0 811 942 | | 2/1999 |
| GB | 2 341 774 | | 3/2000 |
| JP | 9-200269 | | 7/1997 |
| WO | WO 97/50208 | | 12/1997 |
| WO | WO 98/33296 | * | 7/1998 ............... 705/37 |
| WO | WO 00/13121 | | 3/2000 |

* cited by examiner

*Primary Examiner*—Saleh Najjar
*Assistant Examiner*—V. Korobov
(74) *Attorney, Agent, or Firm*—Trop, Pruner & Hu, P.C.

(57) ABSTRACT

Software packages may be distributed to a plurality of clients in a network by initially distributing the software from a server to one or more clients. Those clients may then be enabled to forward the software package on to other clients contained in a list of addressee clients. Each client that receives the software package may then be called upon, in turn, to forward the software package to additional clients on the list. In this way, the load on the network management server, related to the distribution of software to a large number of clients in a network, may be reduced.

25 Claims, 3 Drawing Sheets

PEER TO PEER SOFTWARE DISTRIBUTION SYSTEM

BACKGROUND

This invention relates generally to the distribution of software to processor-based systems.

Software may be distributed from a server to a variety of client processor-based systems. Conventionally, software packages may be periodically sent to a large number of processor-based systems within a network. For example, software updates, new software, application updates, and operating system updates may be distributed from a server to a large number of clients. In distributed networks, it may be necessary to implement an automated system that distributes software to a large number of clients.

Distributing software updates to large numbers of clients connected over a network may dramatically tax server resources. The time and resources devoted to distributing the software to a number of clients may dramatically increase the cost of the software update process. This is particular so when many of the clients may be accessible through relatively low speed connections. For example, with set-top boxes that are basically processor-based systems that use television receivers as displays, relatively lower power processor-based systems may be provided with limited bandwidth Internet connections. The software download speed may be relatively slow. As a result, the server may be taxed with slow downloads to a relatively large number of processor-based systems.

Thus, there is a need for better ways to distribute software to a large number of processor-based systems.

DETAILED DESCRIPTION

Figure 1:
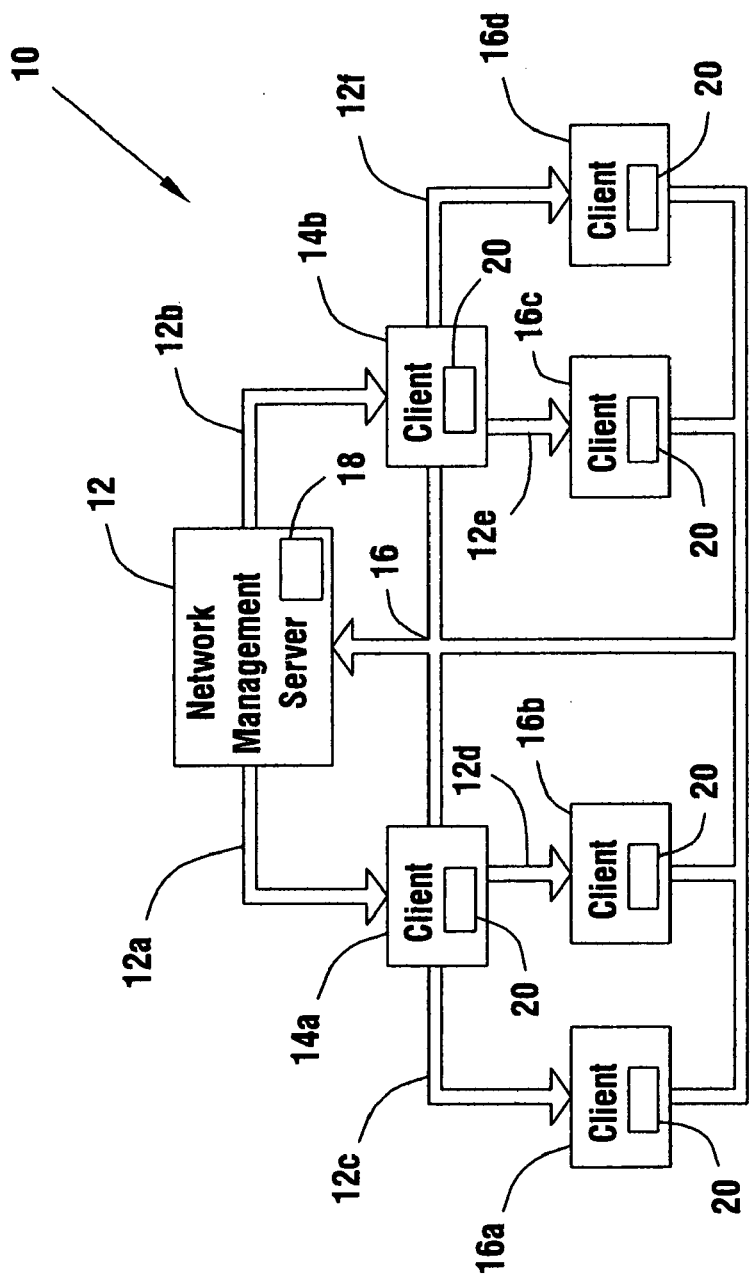
FIG. 1 is a schematic depiction of one embodiment of the present invention.

Referring to FIG. 1, a software distribution system 10 may involve the distribution of software from a network management server 12 to a large number of clients 14 and 16. Each client 14 or 16 may be a processor-based system such as a desktop computer, a set-top box, a processor-based appliance or other processor-based systems. While the embodiment shown in FIG. 1 includes six clients for illustration purposes, a very large number of clients may receive software through the system 10.

In one embodiment of the present invention, a binary tree software distribution system may be utilized. Initially, the network management server (NMS) 12 distributes a software package together with a list of addressees to the client 14a, over the path 12a, and the client 14b over the path 12b. Each of the clients 14 in a first tier of clients then authenticates the package by providing a message back to the server 12 over a back or alternate channel 17 for example. The authentication process assures that only authorized software has been distributed to the client 14 and prevents an outside entity from attempting to disrupt the system 10.

Each client 14 may then distribute the received software to two clients 16 such as the client 16a and 16b in the case of client 14a or the clients 16c and 16d in the case of the client 14b. Each of the clients 16 in turn authenticates the software through the channel 17. Thereafter, each of the clients 16 may in turn distribute the software to additional clients (not shown).

In this way, software may be distributed to clients that install the software and then distribute a copy of the software, together with a list of addressees, to two additional clients. Each time a software receiving client 14 or 16 may delete its identifier from the list of addressees, in one embodiment, so that the software is not repeatedly distributed to the same clients.

The addressee list may also be parseable. The list provided to the client 14a may be half of the original list and the list provided to the client 14b may be the other half of the original list. The client 14a may then parse the list in half again and provide half of the list to the client 16a and half the list to client 16b. Alternatively, the list may be pre-parsed into a plurality of sections, as received.

Each upstream, software distributing server or client identifies a receiving client to receive the software package by taking the next name on the list of addressees, in one embodiment. Thus, each client 14 or 16 may remove its own identifier from the list after receiving the list from an upstream source. Each client 14 or 16 then directs the software package and the list of addressees to the next client on the list. In this way, the software package, together with the addressee list, may be progressively distributed to every client in the network.

Because of the distributed or peer to peer nature of the software distribution system, the demands on the network management server 12 are reduced. The relatively longer time frame involved in downloading the software package is offloaded to the clients 14 and 16. The server 12 may merely provide the needed authentication to the ultimate package recipients.

The authentication may be implemented by causing a client 14 or 16 to provide an authentication code back to the server 12, in one embodiment. If the authentication code is correct, the server 12 acknowledges that a bona fide software package was received.

In some cases, the authentication code may be successively encrypted. The code may also be modified in a known or predetermined fashion by each successive client to avoid theft by unauthorized parties. For example, a rolling code scheme may be used. The package may also be accompanied by a checksum to ensure the package was received correctly.

While a system 10 is illustrated in which each source provides a software package in a binary tree to two ensuing clients, a variety of other distribution techniques may be utilized. The number of clients that receive software from an upstream client is essentially unlimited. To the extent that the number is increased, the load on a particular upstream client software distributor is increased. Eventually, the software distribution load may be noticeable by the involved client's user. Therefore, it may be advantageous to limit the number of clients to which any one client distributes the software package.

The software for enabling the distribution of software packages may, in one embodiment of the present invention, be preloaded on each client 14 or 16. In one case, the entire system 10 is managed by a service provider that controls the hardware and software provided on each client 14 or 16. Thus, the clients 14 and 16 may be provided with the necessary hardware and software (in addition to the software agents that are capable of automatically distributing the software).

In some embodiments of the present invention, when a software package is received, it may be immediately loaded if client resources are available to implement the loading routine. In some embodiments of the present invention, a client 14 or 16 may wait until a period of inactivity in order to distribute the software to additional clients. For example, by monitoring the client's Advanced Configuration and Power Interface (ACPI) power states, such as the processor power states, the client 14 or 16 may determine an advantageous, low activity time to distribute the software. In this way the software distribution is less noticeable and disruptive to the sending client's owner or user. See ACPI Specification, Revision 1.0, Dec. 22, 1996. In another embodiment of the present invention, the software distribution may be programmed to occur at night. As still another embodiment of the present invention, the transfer time may be selectable by the client's user or owner.

In one embodiment of the present invention, the software package may include the software for the receiving client 14 or 16 as well as the software that enables the receiving client, in turn, to distribute the software to ensuing addressees on the list of addresses. In such case, not only does the client 14 or 16 receive a software package such as a software update, it also receives the software to perpetuate the software distribution system. In one embodiment of the present invention, the software distribution software may be extinguished from the client after being executed.

Figure 2:
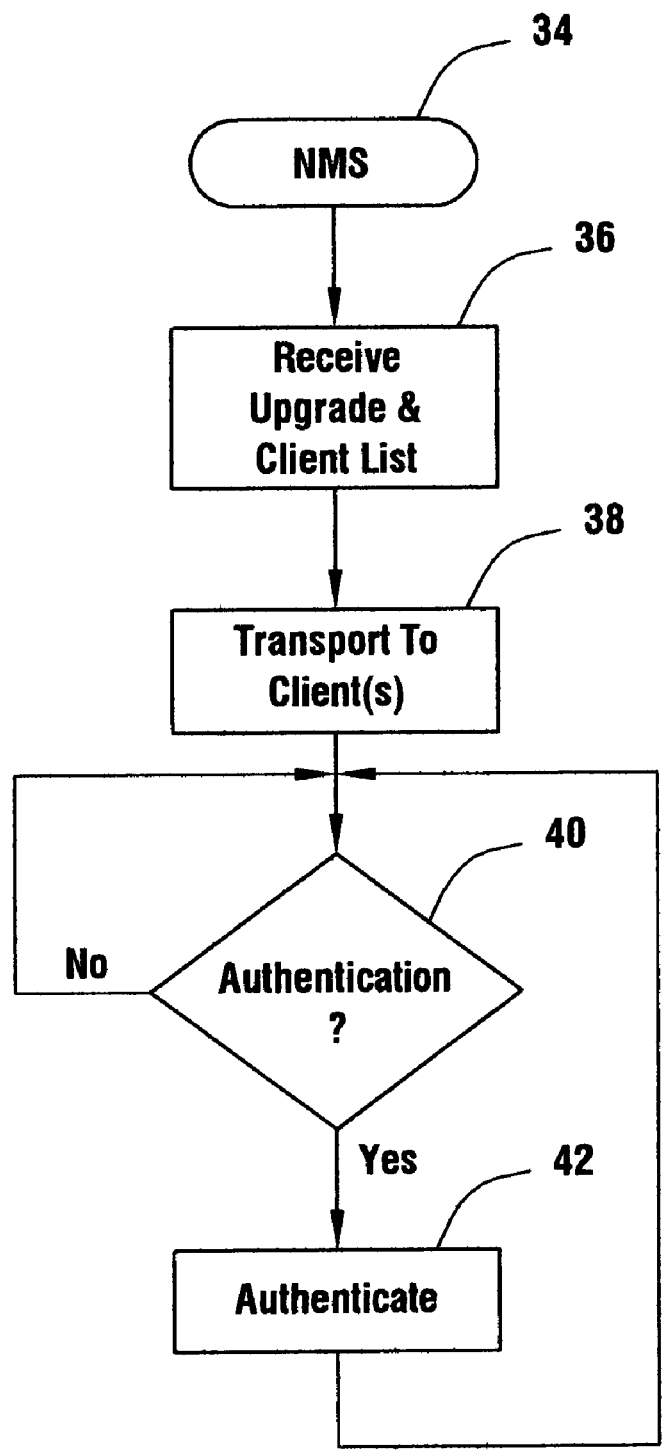
FIG. 2 is a flow chart for software utilized by the network management server shown in FIG. 1 in accordance with one embodiment of the present invention.

Turning next to FIG. 2, the network management server 12 software 34 for distributing the software packages may be stored on a storage device 18. Initially, the software 34 receives a software package together with a list of client addresses as indicated at block 36. These addresses may be in a form recognized by the network, such as Transmission Control Protocol (TCP)/Internet Protocol (IP) ports and addresses as one example. The software package and the addressee list is then transported to some number of clients such as the clients 14a and 14b as illustrated in block 38. At diamond 40, the server 12 awaits an authentication request from each of the clients 14. When the authentication request is received, if the appropriate code is provided, the software package is authenticated, for example by sending an acknowledgement, as indicated in block 42. After the required number of client addresses have received their authentication, the flow may end.

In some embodiments, each client 14 or 16 may notify the server 12 that software was successfully installed on the client 14 or 16. The server 12 may then monitor the amount of time that elapses without receiving a successful installation notification. If the amount of time becomes excessive, the server may check to determine if there is a problem with software installation on a particular client 14 or 16. If there is a problem, the server 12 may intervene to facilitate the installation of software on the client with the problem and on other clients 14 or 16 that may ultimately encounter problems.

Figure 3:
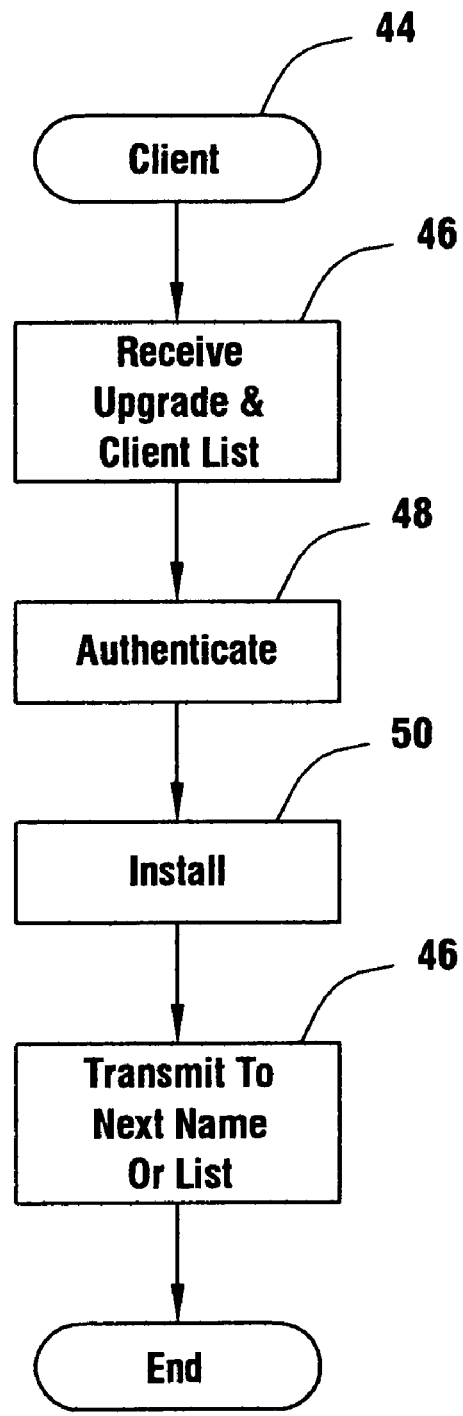
FIG. 3 is a flow chart for software utilized by the clients shown in FIG. 1 in accordance with one embodiment of the present invention.

Referring next to FIG. 3, the client software 44 may be stored on a storage 20 associated with a client 14 or 16. The software 44 is responsible for handling the software package received from an upstream source and distributing the software to one or more downstream receiving clients. Initially, the software package and the addressee list is received by a given client as indicated in block 46. The client authenticates the software with the network management server 12, as indicated in block 48.

The software package may then be installed on the client as indicated in block 50. Thereafter, the software package is distributed to the next name on the list of addressees as indicated in block 52. In addition, in some embodiments, the client 44 may remove its name from the list of addressees. In the case where a sending client provides the addressee list to two receiving clients, the sending client may split the list into two and provide half the list to each of the two receiving clients.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising: forwarding a software package including instructions to install said software package and a list of addressees to a first processor-based system; and enabling said first processor-based system to automatically install said package, automatically forward said software package together with at least part of said list of addressees to a second processor-based system, said second processor-based system being on said list of addressees, and said first processor-based system enabled to automatically delete its address from the list of addresses before forwarding said first processor-based system automatically forwards said at least part of said list of addresses to said second processor-based system.

2. The method of claim 1 including enabling said first processor-based system to install said software package on said first processor-based system, make a copy of said software package, and transmit said software package to said second processor-based system.

3. The method of claim 2 including causing said first processor-based system to automatically authenticate said software package.

4. The method of claim 3 including causing said second processor-based system to automatically authenticate said software package by sending a message to said first processor-based system.

5. The method of claim 4 including forwarding said software package together with a checksum to enable the second processor-based system to confirm with the first processor-based system that the software package was received correctly.

6. The method of claim 1 including causing said first processor-based system to forward said software package to said second and a third processor-based system.

7. The method of claim 1 including encrypting the software package for transmission between said first and second processor-based systems.

8. The method of claim 7 including changing the encryption in a known fashion with each successive transfer from one to the next processor-based system.

9. The method of claim 1 including transferring said software package together with software that enables said second processor-based system to transfer said software package to a third processor-based system.

10. The method of claim 1 including enabling said first processor-based system to forward said software package to said second processor-based system during a low activity time on said first processor-based system.

11. An article comprising a medium storing instructions that, if executed, enable a processor-based system to: forward a software package, including instructions to install said software package, and a list of addressees to a first processor-based system; and enable said first processor-based system to automatically install said package, automatically forward said software package together with at least part of said list of addressees to a second processor-based system, said second processor-based system being on said list of addressees, and enable said first processor-based system to automatically delete its address from the list of addresses before forwarding said first processor-based system automatically forwards said at least part of said list of addresses to said second processor-based system.

12. The article of claim 11 further storing instructions that enable the processor-based system to install said software package, make a copy of said software package, and transmit said package to a first processor-based system.

13. The article of claim 12 further storing instructions that enable the processor-based system to cause said first processor-based system to automatically authenticate said software package.

14. The article of claim 13 further storing instructions that enable the processor-based system to cause said second processor-based system to automatically authenticate said software package by sending a message to said first processor-based system.

15. The article of claim 14 further storing instructions that enable said processor-based system to forward said software package together with a checksum to enable the first processor-based system to confirm that the software package was received correctly.

16. The article of claim 11 further storing instructions that enable the processor-based system to enable said first processor-based system to forward said software package to a second and third processor-based system.

17. The article of claim 11 further storing instructions that enable the processor-based system to encrypt the software package for transmission.

18. The article of claim 17 further storing instructions that enable the processor-based system to enable said second processor-based system to change the encryption in a known fashion.

19. The article of claim 11 further storing instructions that enable the processor-based system to transfer said software package together with software that enables said first processor-based system to transfer said software package to said second processor-based system.

20. The article of claim 11 further storing instructions that enable the processor-based system to enable said first processor-based system to forward said software package to a second processor-based system during a low activity time on the first processor-based system.

21. A system comprising: a processor-based device; a storage coupled to said processor-based device storing instructions that enable the processor-based device to forward a software package, including instructions to install said software package, and a list of addressees to a first processor-based system and enable the first processor-based system to automatically install said package, automatically forward said software package together with at least part of said list of addressees to a second processor-based system, the second processor-based system being on the list of addressees, and enable said first processor-based system to automatically delete its address from the list of addresses before forwarding said first processor-based system automatically forwards said at least part of said list of addresses to said second processor-based system.

22. The system of claim 21 wherein said device is a server.

23. The system of claim 22 wherein said server is a network management server.

24. The system of claim 21 wherein said device is a client.

25. The system of claim 21 wherein said storage stores instructions to automatically transfer the software package, the list of addressees, and software to enable further distribution of the software package to additional processor-based systems.

* * * * *